United States Patent Office 3,409,362
Patented Nov. 5, 1968

3,409,362
SLIT-SCAN PANORAMIC RECTIFIER
Arthur A. Magill, Glen Cove, N.Y., assignor to Fairchild Camera and Instrument Corporation, a corporation of Delaware
Filed Jan. 6, 1966, Ser. No. 519,082
4 Claims. (Cl. 355—52)

ABSTRACT OF THE DISCLOSURE

A slit-scan rectifier for rectifying a panoramic film image comprising a rotatable transparent drum for a film image to be rectified, an illuminated slit for scanning a film image on the drum, a second transparent drum for a print film mounted on a common shaft with the first drum, and an optical scanning system for transferring an image from an image film on the first drum to a print film on the second drum including reflecting mirrors individually mounted within the drums and having an optical axis substantially coincident with the axis of the drums. The radial dimensions of the two drums vary on either side of the position corresponding to the nadir of the film image in accordance with a derived mathematical function.

---

Figure 2:
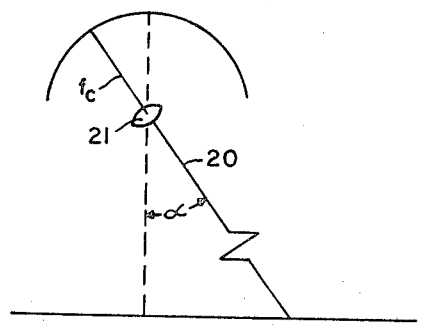

This invention relates to slit-scan panoramic rectifiers and, while it is of general application, it is particularly adapted to rectify a film image taken by a vertically directed panoramic camera.

In aerial photography, the use of panoramic cameras has become widespread. Such a camera comprises an optical system for scanning a field of view transversely to the direction of flight. One such system is described and claimed in United States Patent No. 3,160,082, to Gordon Lysle, dated Dec. 8, 1964. It is customary to rectify the scene of view through an angle of the order of ±60° from the nadir. Obviously, the image of a scene so photographed is greatly distorted due to the very great and cyclical variation of object distance, which tends to compress the transverse dimensions of the image directly with the angle of scan measured from the nadir.

Heretofore there have been proposed numerous arrangements for correcting or rectifying images taken by a panoramic camera. Among these are panoramic rectifiers which have employed computers which control servomechanisms for driving a complex film transport mechanism in the course of making positive prints from a panoramic negative. One such panoramic rectifier is described in an article by Samuel W. Levine in Photogrammetric Engineering for December 1961, pages 740–747. Such a panoramic rectifier is not only costly but requires a substantial amount of time of a skilled operator to program the computer and operate the equipment. Further, such a rectifier includes precision mechanisms which are fragile and not of optimum reliability and are not suitable for transporting in an aircraft.

This invention is based on the discovery that the rectification of film images taken by a panoramic camera can be effected by a simple mechanical-optical system employing substantially unit magnification at the nadir image of the taking camera.

It is an object of the invention, therefore, to provide a new and improved slit-scan panoramic rectifier which obviates the above-mentioned disadvantages of prior panoramic rectifiers.

It is another object of the invention to provide a new and improved slit-scan panoramic rectifier which is simple, rugged, reliable, and involves only a low-cost mechanical-optical scanning apparatus capable of operation by unskilled personnel.

In accordance with the invention, there is provided a slit-scan rectifier for rectifying a panoramic film image comprising a rotatable first cylindrical transparent drum for a film image to be rectified, an illuminated slit for scanning a film on such drum, a second cylindrical transparent drum for a print film rotatable in synchronism with the first drum about a common axis, and an optical scanning system for transferring an image from an image film on the first drum to a print film on the second drum including reflecting mirrors individually mounted within the drums and having an optical axis substantially coincident with the common axis of the two drums. The radial dimension of the first drum relative to that of the second drum varies on either side of the position corresponding to the nadir of the film image in accordance with a predetermined function of the image-film taking angle, thereby to form a rectified print of the film image. The term "cylindrical" is used herein and in the appended claims in its generic sense to describe the surface formed by moving a rectilinear line parallel to itself through a closed path. The term "taking angle" is used herein and in the appended claims to refer to the angular displacement of the panoramic camera scanning device from the nadir. The term "nadir," as applied to the position of a panoramic camera scanner or to the film image formed thereby, is used herein and in the appended claims in its usual sense to mean the position in which the line of sight of the scanner is most nearly in the vertical downward direction.

For a better understanding of the present invention, together with other and further objects thereof, reference is had to the following description, taken in connection with the accompanying drawing, while its scope will be pointed out in the appended claims.

Figure 1:
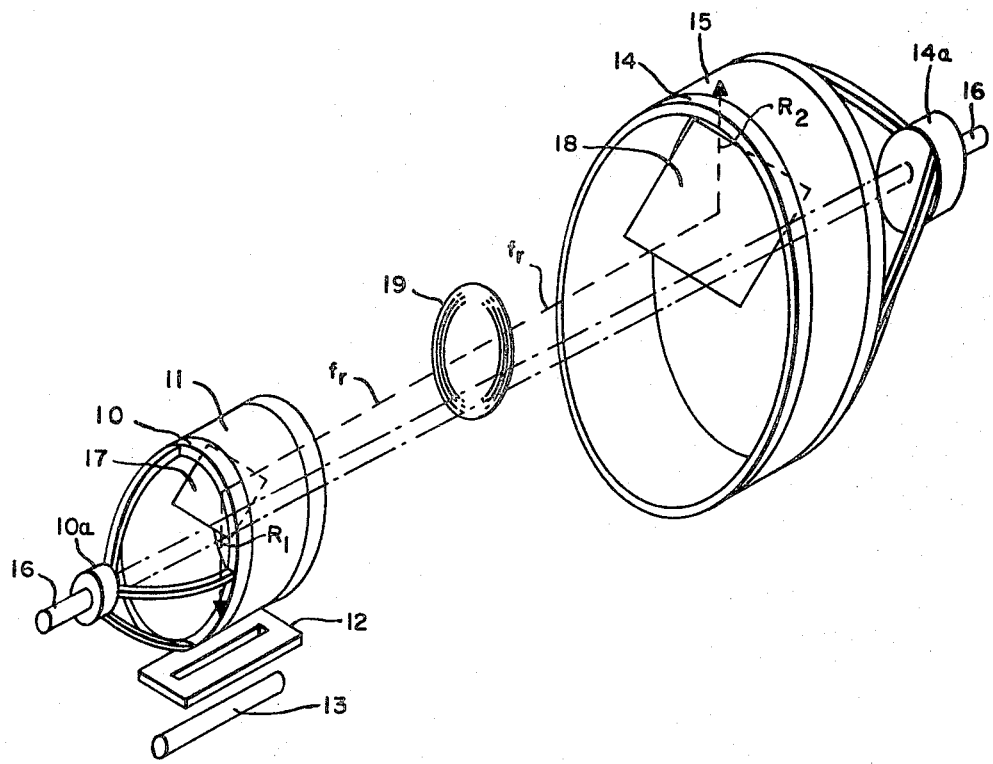

Referring to the drawings:
FIG. 1 is a schematic representation of a slit-scan panoramic rectifier embodying the invention, while
FIG. 2 is a diagram to aid in the explanation of the invention.

Referring now more particularly to FIG. 1 of the drawing, there is shown a slit-scan rectifier for rectifying a panoramic film image comprising a rotatable first cylindrical support for a film image to be rectified, specifically a transparent cylindrical drum 10, on which is mounted a film 11 carrying the image to be rectified. Disposed adjacent the drum 10 is an illuminated slit for scanning a film image on the drum 10 and comprising a slit plate 12 adapted to be illuminated by a linear light source 13.

The rectifier apparatus further comprises a second cylindrical support such as a transparent drum 14 for supporting a print film 15 and rotatable in synchronism with the first support about a common axis, for example as by mounting them on a common shaft 16 by means of hubs 10a and 14a, respectively, secured to the shaft 16.

The rectifier apparatus further comprises an optical scanning system for transferring an image from an image film 11 on the drum 10 to the print film 15 on the drum 14. This optical scanning system includes, in addition to the illuminated slit plate 12, a mirror 17 disposed within the drum 10 and inclined to reflect the portion of the film 11 illuminated by the slit plate 12 to a second mirror 18 disposed within the drum 14 and inclined to reflect the illuminated line upon the print film 15. A transfer lens 19 is interposed in the optical path between the mirrors 17 and 18 to collect the light from the mirror 17 and focus it on the print film 15 after reflection by the mirror 18. The dimensions of the parts are such that the central transverse planes of the drums 10 and 14 intersect the conjugate focal points of the lens 19, which focal points are also approximately at the centers of the mirrors 17 and 18.

The radial dimensions of the supports or drums 10 and 14 at the angular positions corresponding to the nadir of the film image, the positions illustrated in FIG. 1, are preferably equal, corresponding to unity magnification.

For convenience, they are both made approximately half the focal length of the taking camera.

Before explaining the operation of the panoramic rectifier just described, it will be helpful to consider the underlying principles of design. Referring first to FIG. 2, there is represented a light ray 20 coincident with the optical axis of a scanning lens 21 at an angle $\alpha$ from the nadir, the optical system having a nominal focal length $f_c$. It can be shown that the lateral distortion of the panoramic image in the form of an apparent compression of the lateral dimensions of the image with increase in scanning angle varies approximately as $\sec^2 \alpha$. In order precisely to correct for such image distortion, the rectifying apparatus for making prints from such a panoramic image must introduce a reciprocal compensation, that is, a compensation varying as $\cos^2 \alpha$.

Compensation of the type described can be effected by mounting the image film on the drum 10 and the print film on the drum 14, disposed as described above. Since the drums 10 and 14 are mounted on the same shaft, their respective cam angles are equal and it can be shown that precise rectification is effected if the drum 10 is given a configuration represented in coordinates as $$R = f_r \cos \alpha$$
$$X = F_c \alpha \quad (1)$$

and drum 14 is given a configuration in which, for each cam angle $\theta$, the radial coordinate is:

$$R_1 = f_r / \cos \alpha \quad (2)$$

where $f_r$ is the focal length of the rectifying lens 19.

That is, the ratio $R/R_1$ for each cam angle $\theta = \cos^2 \alpha$.

An explicit mathematical solution for the configurations of the two drums is not possible, but the radii of the two drums at corresponding cam angles can be determined by considering incremental cam angles for $\Delta \alpha$ sufficiently small that the chord adequately approximates the curve. With this assumption, the corresponding increment of cam angle $\theta$ for the $n$th increment $\Delta \theta_n$ is given by the expression:

$$\cos \Delta \theta_n = \frac{(f_r \cos \alpha_n)^2 + (f_r \cos \alpha_{n-1})^2 - (f_c \Delta \alpha)^2}{2 f_r^2 \cos \alpha_n \cos \alpha_{n-1}} \quad (3)$$

This can be written:

$$\cos \Delta \theta_n = \frac{1}{2} \left[ \frac{\cos \alpha_n}{\cos \alpha_{n-1}} + \frac{\cos \alpha_{n-1}}{\cos \alpha_n} \right] - \frac{1}{2} \frac{(f_c \Delta \alpha)^2}{f_r^2 \cos \alpha_n \cos \alpha_{n-1}} \quad (4)$$

It has been found that, for a maximum scanning by the panoramic camera of $\pm 60°$, the preferred ratio of the focal length of the camera to that of the rectifier lens, that is, $f_c/f_r$, is approximately 2. When the actual value of $f_c/f_r$ departs from the nominal value of 2, correction need only be applied to the second term of Equation 4, the correction factor being the ratio of the square of the actual value $f_c/f_r$ to 4.

The resultant values of $\Delta \theta_n$ are summed successively to give the series of $\theta$ values. These are not even values and it may be preferable, in practice, to plot the summation values of $\theta$ and to interpolate to determine the appropriate value of $\alpha$ corresponding to even increments of $\theta$. The cosine of the resultant $\alpha$, multiplied by the focal length of the rectifier lens $f_r$, gives the radii of the input drum 10 while the expression $f_r/\cos \alpha$ gives the values of the radii of the output drum 14.

It will be apparent that the cam angle $\theta$ will depend upon the mean values of the drum radii R and $R_1$ selected. These radii will normally be selected so that the input film occupies as much of the complete $\pm 180°$ of the drum from the nadir position consistent with the requirement of dead space for securing the ends of the film.

Thus, the radial dimension of the input drum 10 relative to that of the output drum 14 varies on either side of the nadir position in accordance with a predetermined function of the camera taking angle, in the specific embodiment described as $\cos^2 \alpha$. Preferably, the radial dimension of the input drum 10 varies as $\cos \alpha$ and that of the output drum 14 as $1/\cos \alpha$.

It has been found that by use of the slit-scan panoramic rectifier described, a precise rectification or compensation of panoramic film images can be effected and this without the use of any complex sensing and computing devices and servomechanisms.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A slit-scan rectifier for rectifying a panoramic film image comprising:
    a rotatable first cylindrical transparent drum for a film image to be rectified;
    an illuminated slit for scanning a film image on said first drum;
    a second cylindrical transparent drum for a print film rotatable in synchronism with said first drum about a common axis;
    and an optical scanning system for transferring an image from an image film on said first drum to a print film on said second drum including reflecting mirrors individually mounted within said drums and having an optical axis substantially coincident with the common axis of said drums;
    the radial dimension of said first drum relative to that of said second drum varying on either side of the position corresponding to the nadir of the film image in accordance with a predetermined function of the image-film taking angle,
    thereby to form a rectified print of the film image.

2. A slit-scan rectifier for rectifying a panoramic film image comprising:
    a rotatable first cylindrical support for a film image to be rectified;
    a second cylindrical support for a print film rotatable in synchronism with said first support about a common axis;
    and an optical scanning system for transferring an image from an image film on said first support to a print film on said second support and having an optical axis substantially coincident with the common axis of said supports;
    the radial dimension of said first support relative to that of said second support varying on either side of the position corresponding to the nadir of the film image as $\cos^2 \alpha$, where $\alpha$ is the image-film taking angle measured from the nadir position,
    thereby to form a rectified print of the film image.

3. A slit-scan rectifier for rectifying a panoramic film image comprising:
    a rotatable first cylindrical support for a film image to be rectified;
    a second cylindrical support for a print film rotatable in synchronism with said first support about a common axis;
    and an optical scanning system for transferring an image from an image film on said first support to a print film on said second support and having an optical axis substantially coincident with the common axis of said supports;

the radial dimension of said first support varying as cos α and the radial dimension of said second support varying as 1/cos α on either side of the position corresponding to the nadir of the film image, where α is the image-film taking angle measured from the nadir position, thereby to form a rectified print of the film image.

4. A slit-scan rectifier for rectifying a panoramic film image comprising:

a rotatable first cylindrical support for a film image to be rectified;

a second cylindrical support for a print film rotatable in synchronism with said first support about a common axis;

and an optical scanning system including a rectifying lens unit for transferring an image from an image film on said first support to a print film on said second support and having an optical axis substantially coincident with the common axis of said supports;

the configuration of the cross-section of each of said cylindrical supports being represented by the relation:

$$\cos \Delta\theta_n = \frac{1}{2}\left[\frac{\cos \alpha_n}{\cos \alpha_{n-1}} + \frac{\cos \alpha_{n-1}}{\cos \alpha_n}\right] - \frac{1}{2}\frac{(f_c \Delta\alpha)^2}{f_r^2 \cos \alpha_n \cos \alpha_{n-1}}$$

where:

$\Delta\theta_n$ = incremental angular coordinate of supports from their nadir positions $\alpha$ = image-film taking angle measured from the nadir position $n$ = number of points whose coordinates are to be computed $f_c$ = focal length of the taking camera $f_r$ = focal length of the rectifying lens unit, thereby to form a rectified print of the film image.

References Cited

UNITED STATES PATENTS

| | | | |
|---|---|---|---|
| 1,801,450 | 4/1931 | Owens | 88—24 |
| 3,066,572 | 12/1962 | Von Bubna-Littit | 88—24 |

NORTON ANSHER, *Primary Examiner.*

WAYNE A. SIVERTSON, *Assistant Examiner.*